United States Patent [19]

Katsurada et al.

[11] Patent Number: 5,191,438

[45] Date of Patent: Mar. 2, 1993

[54] FACSIMILE DEVICE WITH SKEW CORRECTION AND TEXT LINE DIRECTION DETECTION

[75] Inventors: Morihiro Katsurada; Sadaaki Shimonaga, both of Nara, Japan

[73] Assignee: Sharp Kabushiki Kaisha, Osaka, Japan

[21] Appl. No.: 625,055

[22] Filed: Dec. 10, 1990

[30] Foreign Application Priority Data

Dec. 12, 1989 [JP] Japan .................................. 1-322845
Dec. 12, 1989 [JP] Japan .................................. 1-322846

[51] Int. Cl.$^5$ ...................... H04N 1/413; G06K 9/32; G06K 9/36
[52] U.S. Cl. .............................. 358/426; 358/261.1; 358/488; 382/46
[58] Field of Search ............ 358/488, 427, 426, 261.2, 358/261.3, 261.1; 382/46, 56; 395/137

[56] References Cited

U.S. PATENT DOCUMENTS

| | | | |
|---|---|---|---|
| 4,387,435 | 6/1983 | Arai et al. ........................ | 340/723 |
| 4,533,959 | 8/1985 | Sakurai ............................ | 382/46 |
| 4,642,700 | 2/1987 | Ohta et al. ...................... | 358/488 |
| 4,792,981 | 12/1988 | Cahill, III et al. ............. | 358/261.3 |
| 4,829,452 | 5/1989 | Kang et al. ..................... | 358/488 |
| 4,953,230 | 8/1990 | Kurose ............................ | 358/488 |
| 5,031,225 | 7/1991 | Tackikawa et al. ............ | 382/46 |
| 5,033,104 | 7/1991 | Amano ............................ | 382/56 |
| 5,093,653 | 3/1992 | Ikehira ........................... | 358/488 |

FOREIGN PATENT DOCUMENTS

| | | | |
|---|---|---|---|
| 3736221 | 10/1987 | Fed. Rep. of Germany . | |
| 55-154871 | 5/1979 | Japan . | |
| 0114563 | 7/1983 | Japan ........................ | 358/488 |
| 62-206962 | 9/1987 | Japan . | |
| 63-88863 | 4/1988 | Japan . | |

OTHER PUBLICATIONS

"A Draft of CCITT Recommendation Related to the Facsimile Transmission Coding Systems Group III".
"Background Description of the Coding Systems Such as MH, MR, MMR Systems" Nikkei electronics May 30, 1988.
Advances in Facsimile Art, by Kazuo Kobayashi, 2460 IEEE Communication Magazine, vol. 23 (1985) Feb. No. 2, New York, N.Y. U.S.A.

Primary Examiner—Edward L. Coles, Sr.
Assistant Examiner—Jill Jackson

[57] ABSTRACT

Disclosed is a facsimile device enabling data transmission in high efficiency independently of the direction in which an original is drawn into the facsimile device. The facsimile device includes a scanner for reading the original, an image memory for storing a read image signal, a circuit for detecting the direction of text lines of a read pixel signal, a circuit for determining whether or not the text line direction is close to a longitudinal direction or a lateral direction of arrangement of memory cells in the image memory, a circuit for executing an operation for rotating the image signal by a predetermined angle when a determination is made that the text line direction is closer to the longitudinal direction, a compression circuit for reading the rotated image signal in the lateral direction of the arrangement of the memory cells, to compress the read image signal, and a transmission circuit for transmitting the compressed signal onto lines.

8 Claims, 10 Drawing Sheets

FIG.1
PRIOR ART
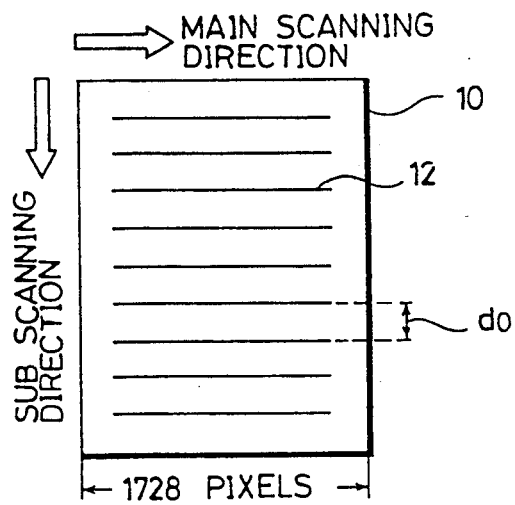
FIG.2
PRIOR ART
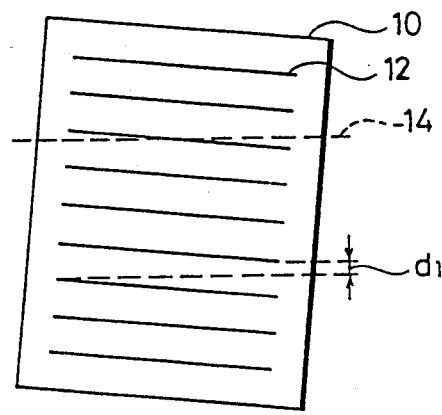
FIG.3
PRIOR ART
| WHITE RUN-LENGTH | CODE | BLACK RUN-LENGTH | CODE |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| ⋮ | ⋮ | ⋮ | ⋮ |
| 59 | 01001010 | 59 | 000000101011 |
| 60 | 01001011 | 60 | 000000101100 |
| 61 | 00110010 | 61 | 000001011010 |
| 62 | 00110011 | 62 | 000001100110 |
| 63 | 00110100 | 63 | 000001100111 |

| WHITE RUN-LENGTH | CODE | BLACK RUN-LENGTH | CODE |
|---|---|---|---|
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| ... | ... | ... | ... |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |

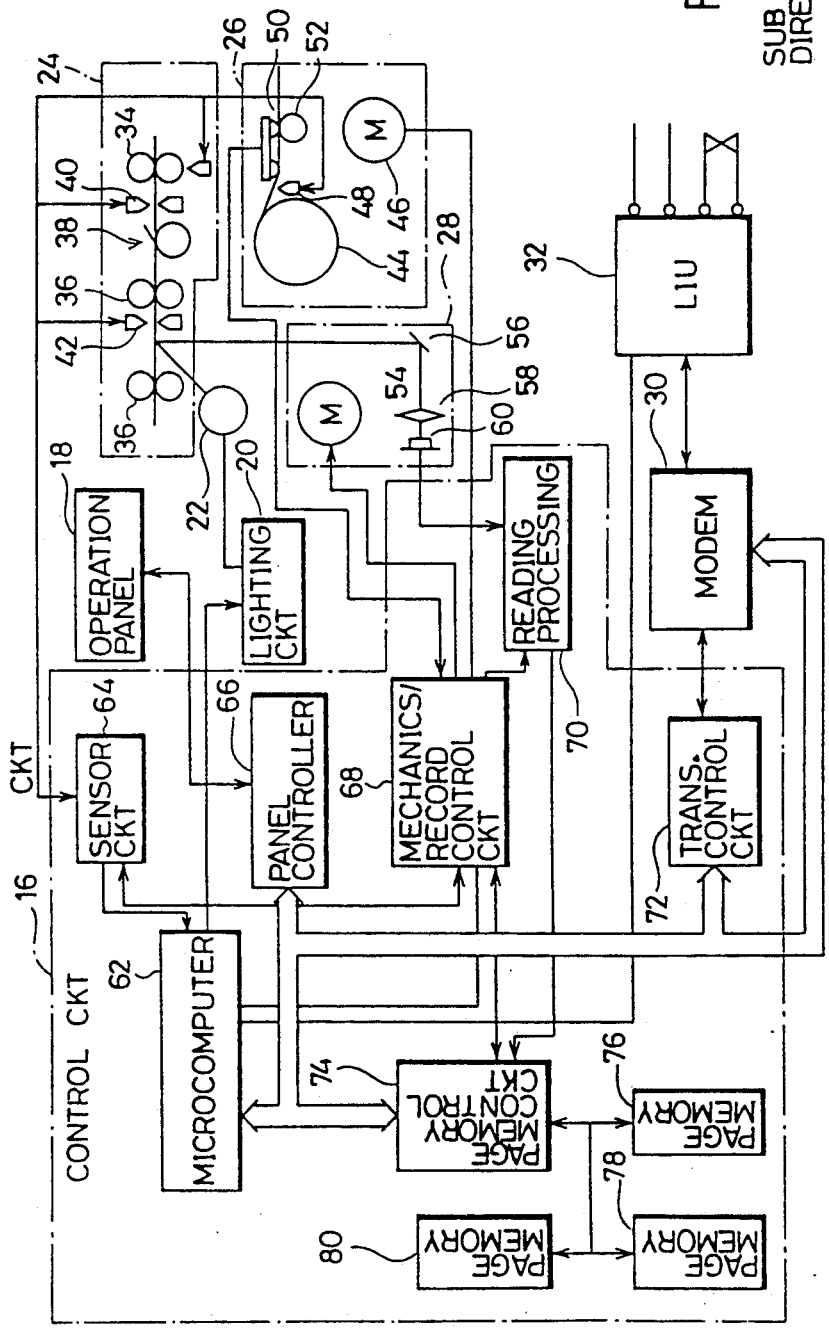
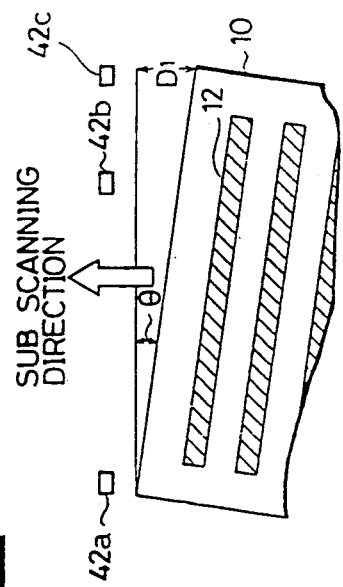
FIG.5
FIG.6

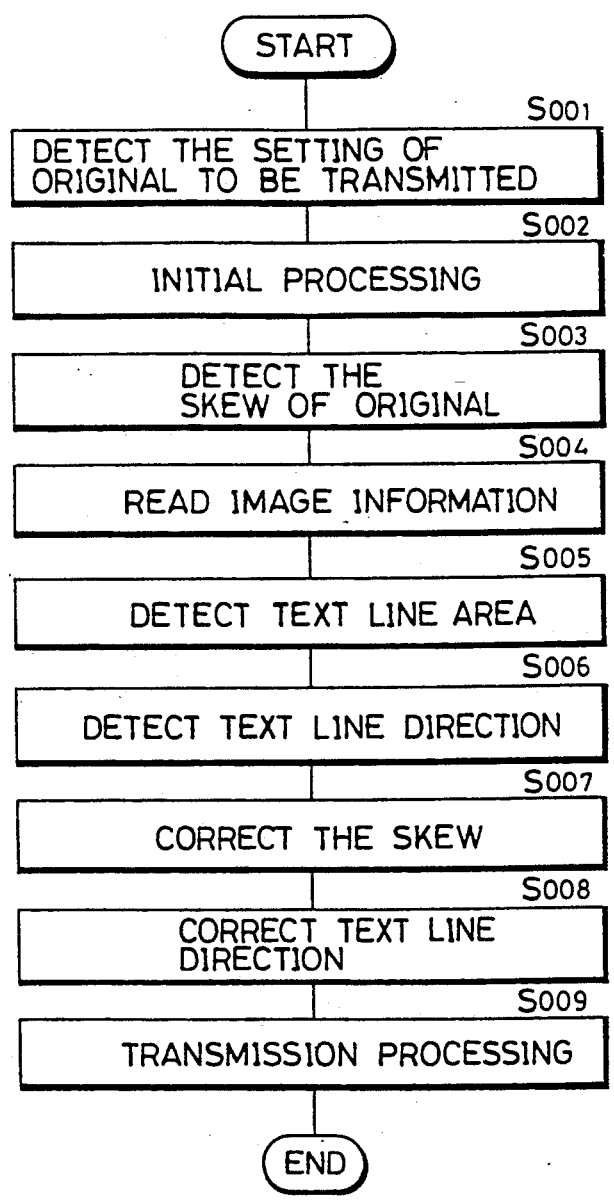

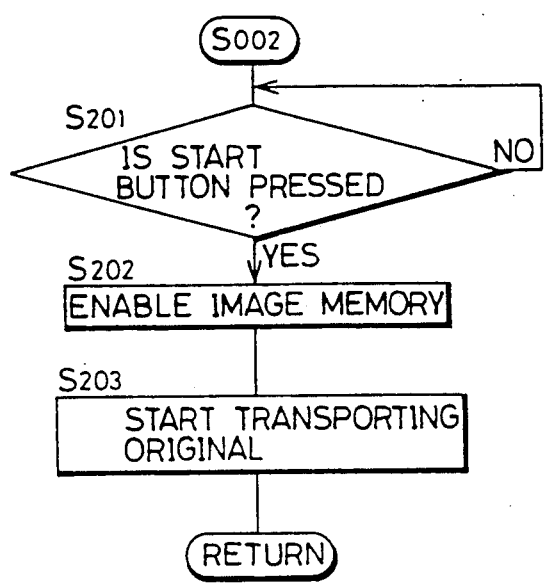
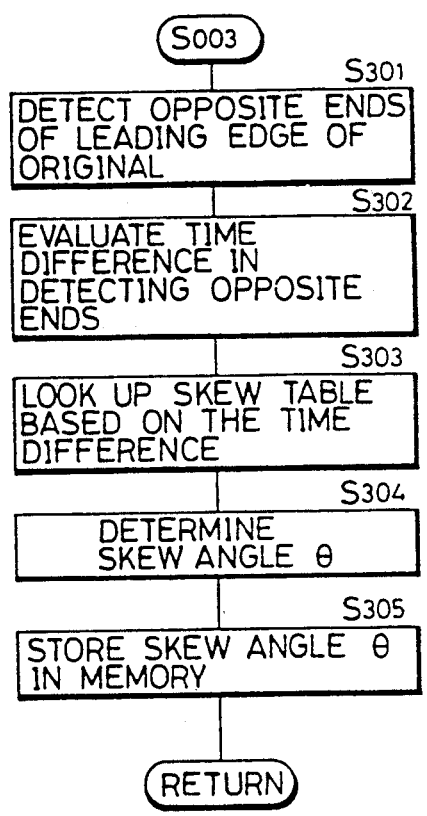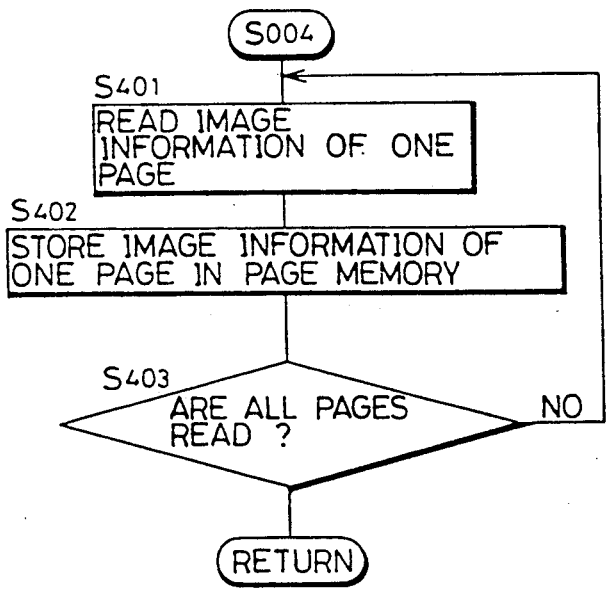

FACSIMILE DEVICE WITH SKEW CORRECTION AND TEXT LINE DIRECTION DETECTION

BACKGROUND OF THE INVENTION

1. Field of the Invention

The present invention relates generally to facsimile devices and, more particularly, to a facsimile device capable of transmitting an image in high efficiency.

2. Description of the Related Art

In recent years, facsimile devices have been playing a significant role in the field of data communication. The facsimile devices serve to read images printed or handwritten on paper or the like by employing scanners including, for example, CCD (Charge-Coupled Device) image sensors and to convert the read images into a digital signal. This digital signal is converted into a compressed digital signal by a coding system called MH (Modified Huffman), MR (Modified READ), MMR (Modified MR), etc. The compressed digital signal is then converted into an analog signal, which is then transmitted onto telephone lines.

FIG. 1 shows the principle of reading of an original in a facsimile device in accordance with the CCITT recommendation. With reference to FIG. 1, an original 10 of ISOA4 size, for example, is read in a main scanning direction by a CCD sensor or the like. One main scanning line is divided into 1728 pixels and then converted into a digital signal in accordance with the luminance thereof. Main scanning is repeated repeats in a sub scanning direction orthogonal to the main scanning direction. When the scanning in the sub scanning direction is completed, the original 10 is entirely converted into the digital signal.

An image which is converted into a digital signal is compressed by the above-described system of MH, MR, MMR or the like. The compressed signal is transmitted onto lines via a modem and then transmitted to another facsimile device on the end of the line.

A processing reverse to that of the sending end is performed at the receiving end. More specifically, the facsimile device at the receiving end converts a received analog signal into a digital signal. The converted digital signal is converted into an uncompressed digital signal by an expansion processing reverse to the compression processing. The resultant digital signal is printed by the same procedure as that employed when the original is read, so that the original image is obtained.

The compression/expansion of the original is directed to enhancing utilization efficiency of the lines and to reduction of communication time by reducing the amount of data to be transmitted.

FIGS. 3 and 4 show as an example the coding system of the MH method. An MH code is based on a one-dimensional run-length coding system. In this system, data of one line is formed of a series of variable-length codes. Each code represents a white or black run-length. A white run-length is called a "white run". A black run-length is called a "black run". A white run and a black run are generated alternately. All lines start with white run codes so as to ensure synchronization of signals for a receiver. If an actual scanning line starts with a black run, a code representing the white run having a length 0 is transmitted. The MH code includes two types of codes, i.e., a terminating code and a makeup code.

FIG. 3 shows the terminating code. The terminating code represents the run-length from 0 to 63 pixels. In order to enhance compression efficiency, a shorter code is allotted to a run-length frequently appearing in image information.

FIG. 4 shows the makeup code. The makeup code represents the run-length from 64 to 1728 pixels in combination with the terminating code. More specifically, the run-length from 64 to 1728 pixels is first coded by a makeup code indicating a run-length equal to or shorter than that run-length. A terminating code thereafter follows indicating the difference between the actual run-length and that represented by the makeup code.

The receiver can obtain uncompressed data by comparing the received data and a previously prepared table for decoding.

As described above, the compression of the transmitted data employing the codes enables the facsimile device to perform the image transmission in high efficiency and in short time.

The facsimile device, however, has the following disadvantages. When original 10 is properly supplied to the device, and the main scanning direction matches the extending direction of text lines 12, as shown in FIG. 1, highly efficient compression by coding is achieved.

However, when original 10 is supplied on the skew, and the main scanning direction does not match the direction of text lines 12, as shown in FIG. 2, the efficiency of compression decreases. This results from the following reasons.

As above mentioned, in the coding system, shorter codes are allotted to the run-lengths frequently appearing in the image information, whereas relatively long codes are allotted to the run-lengths less frequently appearing. Thus, when the direction of a main scanning line 14 read by a single main scanning does not match the direction of text lines 12, as shown in FIG. 2, the frequency of appearance of the run-lengths becomes irregular, resulting in lower efficiency of data compression.

In addition, suppose that the text lines are arranged with spacing d0 as shown in FIG. 1. When original 10 is supplied to the facsimile device in a proper direction, the main scanning line existing within this spacing d0 includes only one white run. Thus, an image of this part can be coded in very high efficiency by employing the above-described makeup code. On the other hand, when original 10 is supplied on the skew to the facsimile device as shown in FIG. 2, the scanning line including only one white run in the sub scanning direction is limited within a spacing d1. As apparent from the figures, spacing d1 is considerably shorter than spacing d0. Accordingly, the compression efficiency in the case shown in FIG. 2 is significantly degraded as compared to the case shown in FIG. 1.

To solve the foregoing problem, a facsimile device and the like performing the function of detecting and then correcting the skew of the original prior to coding are proposed in, e.g., Japanese Patent Laying-Open Nos. 55-154871, 62-206962, 63-88963, etc.

In Japanese Patent Laying-Open No. 55-154871, an original reading method is proposed in which paper including specific marks attached thereto is employed as an original in a facsimile device. The skew of the original can be recognized by detecting the marks upon reading of the original. Data is subject to the transformation of a coordinate system so as to compensate for this skew of the original. This enables an increase in efficiency of coding.

In Japanese Patent Laying-Open No. 62-206962, it is proposed to employ in an original scanner of a facsimile device, sensors for detecting the time when a leading edge of a supplied original passes. Detecting the difference in respective times when two parts of the leading edge of the original supplied at predetermined speed pass a predetermined sensor makes it possible to specify the spatial relationship between those two parts, and simultaneously the size of the supplied original. The amount of skew of the original can be informed based on the information of the spatial relationship and the size of the original. The compression efficiency of data can be enhanced by subjecting the data to the transformation of the coordinate system so as to compensate for the obtained skew of the original.

In Japanese Patent Laying-Open No. 63-88963, it is proposed to adopt to scanning of an original in a facsimile device, a method of detecting the time when one end (extending in a sub scanning direction) of the original is read in response to a change in signal level caused in reading of the original. In each of the main scannings, writing of data into an image memory starts upon the time when the end of the paper is detected. By employing this method, one end of the original is stored in the image memory in such a manner that the one end always be parallel with ends of the image memory. An image per se becomes the one from which the skew of the original is removed, resulting in enhanced compression efficiency.

The foregoing conventional art, however, still presents the following disadvantages. A language in which a text can be written in both vertical and lateral lines is taken as an example such as the Japanese language. In such a language, such a case may occur, as shown in FIG. 4A, that paper of A4 size on which the text is vertically written may be supplied to an original reading unit of a facsimile device in a longitudinal direction of the paper. In this case, compression efficiency can not be enhanced even if the skew of the original is detected and corrected.

Further, even when laterally written documents are supplied to the reading unit, the same problems take place if the documents are fed in a direction crossing the direction of text lines.

SUMMARY OF THE INVENTION

One object of the present invention is therefore to provide a facsimile device in which data compression by coding is achieved in higher efficiency independently of a drawn-in direction of an original.

Another object of the present invention is to provide a facsimile device in which data compression by coding is achieved in higher efficiency even if an original is supplied in a direction substantially identical to the direction of text lines.

A further object of the present invention is to provide a facsimile device in which data compression by coding is achieved in the same degree of efficiency as that required when an original is supplied in a direction crossing the direction of text lines, even if the original is supplied in a direction substantially identical to the direction of text lines.

A facsimile device in accordance with the present invention includes: a pixel signal generating device for reading an image on an original by partitioning the same into a plurality of pixels arranged two-dimensionally, to produce a pixel signal for each pixel indicating luminance of each pixel; and a pixel signal memory including a plurality of memory cells for each storing the pixel signal logically associated with one of the pixels. The plurality of memory cells are logically arranged in a two-dimensional manner in a predetermined first direction and a second direction crossing the first direction in correspondence with the arrangement of the plurality of pixels. The facsimile device in accordance with the present invention further includes: a text line direction detector responsive to a pixel signal stored in the pixel signal memory for detecting a text line direction indicating the extending direction of a text line included in an image on the original represented by the stored pixel signal, in the arrangement of the plurality of memory cells; a text line direction determining device for determining whether the text line direction is closer to the first direction or to the second direction; an image rotating device responsive to an output of the text line direction determining device for electronically rotating by a predetermined angle the image on the original represented by the stored pixel signal so as to make the text line direction closer to the first direction, when the text line direction is closer to the second direction than the first direction; a signal compressing device for reading the stored pixel signal rotated by the image rotating device from the pixel signal memory in the first direction, to compress the read pixel signal by employing a compression code; and a transmitter for transmitting the pixel signal compressed by the signal compressing device via a communication line to another station.

In the facsimile device thus structured, the read image on the original is converted into the pixel signal, to be stored in the arrangement of the memory cells. A detection is made as to in which direction the text lines of the original extend in the memory cell arrangement. Further, a determination is made as to whether the text line direction is closer to the first or second direction of the memory cell arrangement. If a determination is made that the text line direction is closer to the second direction, the image is rotated by a predetermined angle by the image rotating device, so that the text line direction is set to be closer to the first direction. The signal compressing device reads an image signal from the memory cell arrangement in the first direction and then encodes the read image signal. Since blank lines between the text lines extend in the same direction as the text line direction, the average length of white runs in the first direction increases as compared to the case where the image is not rotated, whereas the number of white and black runs decreases by rotating the image in the above-described manner. In a compression coding system, in general, one white run is converted into a set of codes. Therefore, the number of codes after compression decreases, and compression efficiency increases in the facsimile device in accordance with the present invention.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are schematic diagrams of an original;

FIG. 3 is a table showing a part of a terminating code included in an MH code;

FIG. 5 is a block diagram of a facsimile device according to a preferred embodiment of the present invention;

FIG. 6 is a diagram schematically showing the arrangement of a sensor for sensing a leading edge of an original supplied to the facsimile device;

FIGS. 12-19 are flow charts of a program executed by a microcomputer in a facsimile device according to a first preferred embodiment of the present invention.

DESCRIPTION OF THE PREFERRED EMBODIMENTS

Figures 4, 4A:
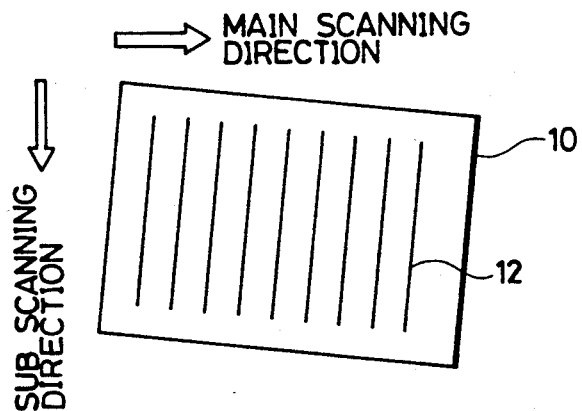
FIG. 4 is a table showing a part of a makeup code included in the MH code.
FIG. 4A is a schematic diagram of the original.

FIG. 5 is a circuit block diagram of a facsimile device in accordance with the present invention. With reference to FIG. 5, this facsimile device includes: a control circuit 16 for controlling the entire device; an operation panel 18 connected to control circuit 16; an original feeding mechanism 24 controlled by control circuit 16 for supplying an original to be transmitted for reading; a fluorescent lamp 22 for illuminating the original transported by original feeding mechanism 24; a lighting circuit 20 controlled by control circuit 16 for controlling the lighting of fluorescent lamp 22; a reading mechanism 28 for reading the original by photoelectric conversion upon receiving a light beam emitted by fluorescent lamp 22 and reflected by the original; a printing mechanism 26 connected to control circuit 16 for printing the received original on recording paper 44; an LIU (Line Interface Unit) 32 for interfacing this facsimile device with telephone lines; and a modem 30 for mutually converting an analog signal transmitted onto/from the lines and a digital signal handled in control circuit 16.

Control circuit 16 includes a sensor circuit 64 for controlling sensors provided in certain positions, to process a signal from each sensor, a panel controller 66 for monitoring key entries by scanning the keys on operation panel 18 and also controlling the lighting of an LED (Light Emitting Diode) on operation panel 18, a mechanics/recording control circuit 68 for controlling a motor or the like feeding the original and recording paper 44, and also controlling a printing head and printing pressure of printing mechanism 26, a reading processing circuit 70 for controlling an analog image signal generated by reading mechanism 28 at a definite level by an AGC (Auto Gain Control) processing, and also correcting optical distortion due to an optical system included in reading mechanism 28 and signal distortion due to variations in sensitivity of a CCD image sensor, and a transmission control circuit 72 for controlling a data transmission processing performed by modem 30.

This facsimile device further includes a microcomputer 62 connected to sensor circuit 64, panel controller 66, mechanics/recording control circuit 68, transmission control circuit 72 and modem 30 for controlling a transmission control procedure in each mode performed in each of those circuits, a coding/decoding processing, an operation in a self-diagnostic mode, etc., a page memory 76 for storing a digital signal of a read image supplied as an output from reading processing circuit 70, page memories 78 and 80 for storing a digital image signal which is stored in page memory 76 and subjected to correction, which is a feature of the present invention, and a page memory control circuit 74 connected to microcomputer 62, mechanics/recording control circuit 68, reading processing circuit 70 and page memories 76, 78 and 80 and controlled by microcomputer 62 for controlling the writing and the reading of an image signal to and from page memories 76, 78 and 80.

Original feeding mechanism 24 includes a feeding roller 34 for supplying originals one by one sheet for reading, a rubber plate 38 for separating the originals, transport rollers 36 driven by a pulse motor, not shown, for feeding the originals, original sensors 40 disposed between feeding roller 34 and rubber plate 38, with the plane of the originals transported being interposed in the original sensors 40, for detecting that the originals are set and for applying a signal indicating the setting of the originals to sensor circuit 64, an original end sensor 42 disposed between transport rollers 36 and immediately in front of a position where the originals are illuminated with light from fluorescent lamp 22, for detecting opposite ends of the leading edge of the supplied originals, and for applying a signal indicating the detection of the opposite ends of the leading edge to sensor circuit 64.

Printing mechanism 26 includes a paper empty detecting sensor 48 for detecting paper empty of recording paper 44, a thermal head 50 connected to mechanics/recording control circuit 68 for scanning recording paper 44 in response to a signal applied from mechanics/recording control circuit 68, to form an image on recording paper 44, a roller 52 for holding recording paper 44 interposed between thermal head 50 and roller 52, and a pulse motor 46 for rotating roller 52 to draw out recording paper 44.

Reading mechanism 28 includes a mirror 56 for reflecting light emitted from fluorescent lamp 22 and then reflected on the surface of the original, to introduce the reflected light along a predetermined optical path, a lens 58 mounted on the path of the light reflected by mirror 56 for converging a light beam from the original, to form an image of the original, a CCD 60 of 2048 bits for converting the image of the original formed by lens 58 into an electrical signal by photoelectric conversion, to apply the converted electrical signal to reading processing circuit 70, and a motor 54 for shifting lens 58 and CCD 60 to predetermined positions in accordance with the scale of magnification.

With reference to FIG. 6, original end sensor 42 shown in FIG. 5 includes a sensor 42a for detecting the left end of the leading edge of original 10 supplied to sensor 42, a sensor 42b provided with a distance corresponding to the lateral width of paper of ISOB5 size apart from sensor 42a, for detecting the right end of the leading edge of the paper of B5 size, and a sensor 42c provided with a distance equal to the lateral width of paper of ISOA4 size apart from sensor 42a, for detecting the right end of the A4-size paper.

The feature of the facsimile device in accordance with the present invention is that the facsimile device performs a function of detecting the direction of text lines on the original, to convert a read image signal by employing page memories 76-80 so as to achieve the highest compression efficiency as well as simply correcting the skew of the original in accordance with a program executed in microcomputer 62.

The facsimile device in accordance with the present invention performs the following operations, with reference to FIGS. 5-11. A description will now be given of the principle of the operation of the facsimile device upon reading the original, with which the present invention is mainly concerned.

An operator sets an original to be transmitted on a feeding tray, not shown, provided in contact with feeding roller 34. Sensor 40 detects that the original is set and applies a signal indicating the setting of the original to sensor circuit 64. The operator then pushes a start button, not shown, on operation panel 18. Panel controller 66 serves to scan each key on operation panel 18 as described above, so that the panel controller 66 detects that the start button is pressed by the operator. Panel controller 66 then applies a signal indicating the pressing of the start button to microcomputer 62.

Microcomputer 62 receives the signal indicating the setting of the transmitted original and the signal indicating the pressing of the start button from sensor circuit 64 and panel controller 66, respectively, and then performs the following operation. Microcomputer 62 first controls page memory control circuit 74 so as to put page memories 76-80 in an enable state in which an image can be written in page memories 76-80. Microcomputer 62 thereafter controls mechanics/recording control circuit 68 to operate a pulse motor, not shown, for transport of the original. Transport roller 36 is rotated by this pulse motor, so that the original is transported in the sub scanning direction. At this time the original separated by rubber plate 38 is transported for reading one by one.

The transported original passes sensor 42 before being read by CCD 60. Referring to FIG. 6, assume that the leading edge of original 10 is in a skewed position by an angle $\theta$ to the main scanning direction (orthogonal to the direction in which the original is transported). This original 10 is also assumed to be of A4 size. Because of the skew angle $\theta$, there is a deviation of a distance D1 in the sub scanning direction between the left end and the right end of the leading edge of original 10.

The transport speed of original 10 is detected by circuit 68, so that microcomputer 62 can be informed of that speed in advance. Microcomputer 62 can also be informed of the lateral width of original 10 by a sensor output. Accordingly, the skew $\theta$ can be easily known by perceiving the time period between the time when sensor 42a detects the passage of the left end of the leading edge of original 10 and the time when sensor 42c detects the passage of the right end thereof.

When the paper 10 is of B5 size, skew $\theta$ can be known in response to signals of sensors 42a and 42b.

The signals of sensors 42a-42c are applied to sensor circuit 64. Sensor circuit 64 supplies an output result of each of sensors 42a-42c to microcomputer 62. Microcomputer 62 evaluates skew $\theta$ in accordance with a predetermined arithmetic operation.

Microcomputer 62 controls lighting circuit 20 to light fluorescent lamp 22. A light beam emitted from fluorescent lamp 22 is reflected on a surface of the original and then reaches mirror 56. The light beam reflected at mirror 56 and converged by lens 58 forms an image of the original on a light receiving plane of CCD 60. At this time, the position of lens 58 and CCD 60 is shifted by motor 54 dependently on the size of the original, so that the magnification of the image is adjusted. CCD 60 electrically scans the image of the original in the main scanning direction and supplies as an output an analog signal corresponding to luminance on the surface of the original to reading processing circuit 70.

Reading processing circuit 70 subjects the analog signal supplied from CCD 60 to an AGC processing to make the level of the signal controlled. Further, reading processing circuit 70 corrects optical distortion and a distortion caused by deviation in sensitivity of the CCD, which are included in a signal output from the CCD, and then supplies the corrected signal to page memory control circuit 74.

Page memory control circuit 74 starts writing an output of reading processing circuit 70 into page memory 76 at the same time sensor 42a shown in FIG. 6 detects the passage of the left end of the leading edge of the original.

Figure 7:
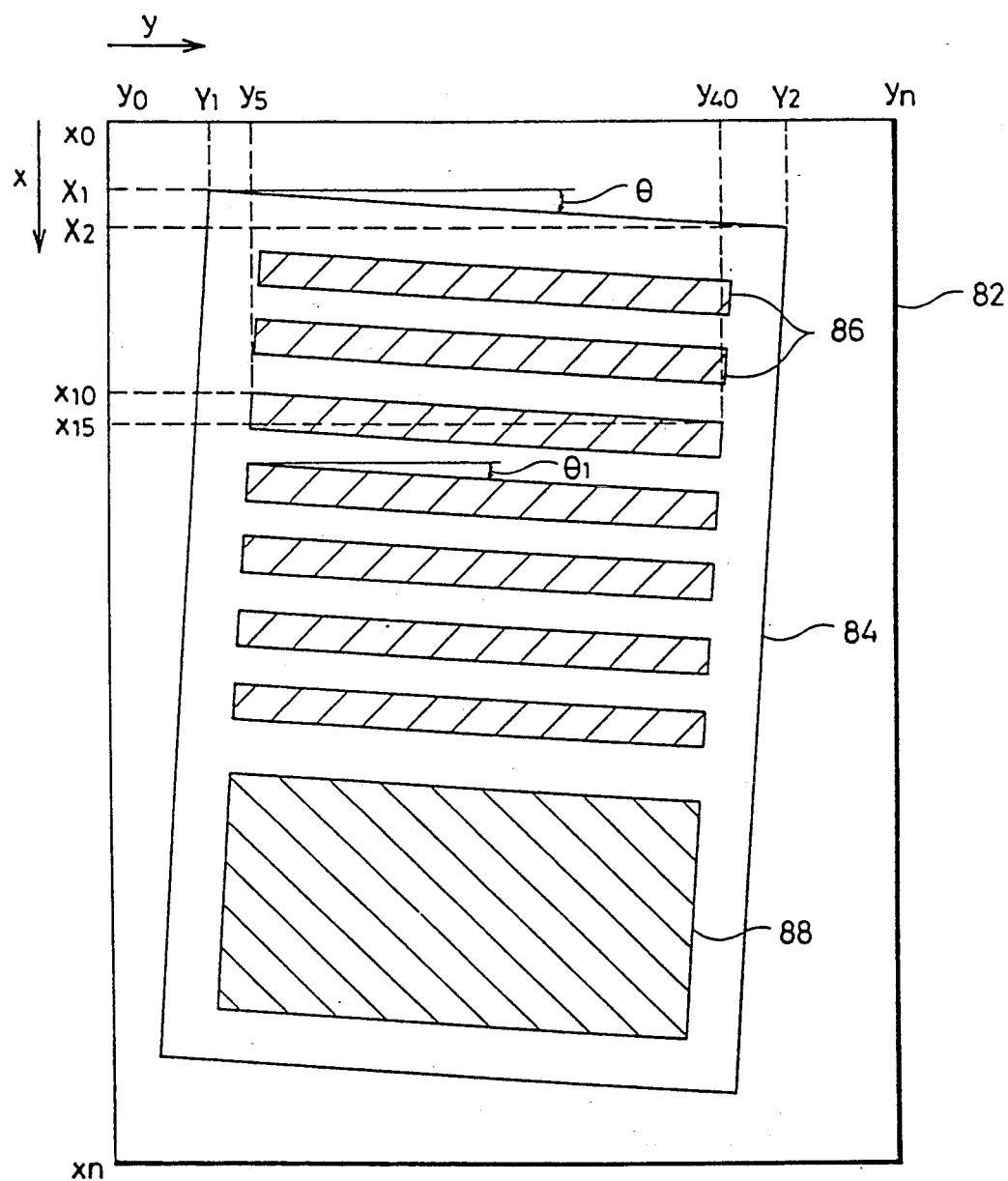
FIGS. 7-10 are illustrations of an image of the original stored in a page memory.

The output of the reading processing circuit is written into page memory 76 as follows. Referring to FIG. 7, page memory 76 has an image storage area 82 including memory cells arranged two-dimensionally in x and y directions. Page memory 76 sequentially stores a signal obtained by a single main scanning into one line in the y direction of the memory cells at a definite address in the x direction. The address in the x direction is incremented as the sub scanning proceeds Accordingly, an original image 84 is formed in image storage area 82 as a mass of main scanning lines arranged in the sub scanning direction.

Referring to FIGS. 5 and 6, a definite time difference is observed between the time when sensor 42a detects the left end of the leading edge of original 10 and the time when CCD 60 detects the same portion as the left end, due to a deviation between the position of sensor 42 and the position of the original that is actually read by CCD 60. Thus, as shown in FIG. 7, the extreme left end of the leading edge of original image 84 is stored at an address X1 in the x direction and an address Y1 in the y direction in image storage area 82 of page memory 76. After that, the image of the original is stored in page memory 76 in the form shown in FIG. 7.

With reference to FIG. 7, image storage area 82 of page memory 76 has addresses $x_0-x_n$ in the x direction and addresses $y_0-y_n$ in the y direction. The left end of the leading edge of original image 84 stored in page memory 76 has an address $(x_1, y_1)$, while the right end of the leading edge thereof has an address $(x_2, y_2)$. The difference between the addresses $(x_1, y_1)$ and $(X_2, Y_2)$ is due to the skew angle $\theta$ of the original as described above.

The skew angle $\theta$ of the original can easily be evaluated from outputs of sensors 42a and 42c. Microcomputer 62 subjects original image 84 to the transformation of a coordinate system by employing the evaluated skew angle $\theta$, and then writes transformed data into page memory 78. This transformation of the coordinate system is carried out employing a method disclosed in, for example, U.S. Pat. No. 4,829,452 so that original image 84 is electronically rotated by an angle $\theta$ at a predetermined point in image storage area 82, e.g., around an address $(x_0, y_0)$.

Figure 8:
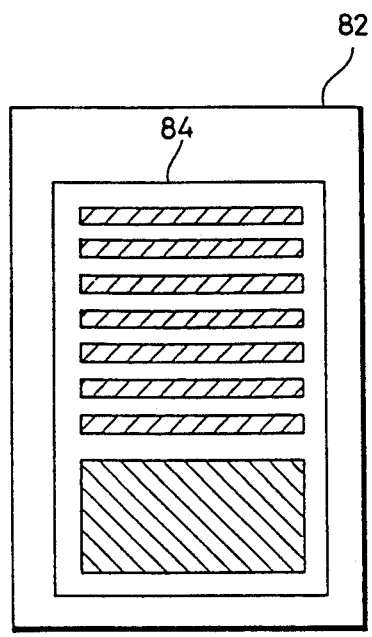

Data stored in page memory 78 as the result of the transformation has a form as shown in FIG. 8, in which respective four sides of the original are parallel with corresponding sides of image storage area 82. As a result, when the original is supplied in the manner shown in FIG. 7, the direction of text lines matches the y direction of the memory cells of the page memory.

If the image of the original is converted in the foregoing manner, and this image signal is read out in the y direction of the addresses of the page memory, the compression of the signal is enabled on the same condition as that for reading when the original is drawn in on the skew of 0. The compression efficiency of the image signal is significantly enhanced as compared with the case where the image signal is compressed as shown in FIG. 7.

When original 10 is supplied on the skew so that the direction of text lines 12 on original 10 is deviated by a small angle $\theta$ from the main scanning direction of the image, the foregoing transformation of the coordinate system makes it possible to immediately obtain the corrected image signal having the highest compression efficiency. However, the original is not always supplied in such a direction to the facsimile device.

Figure 9:
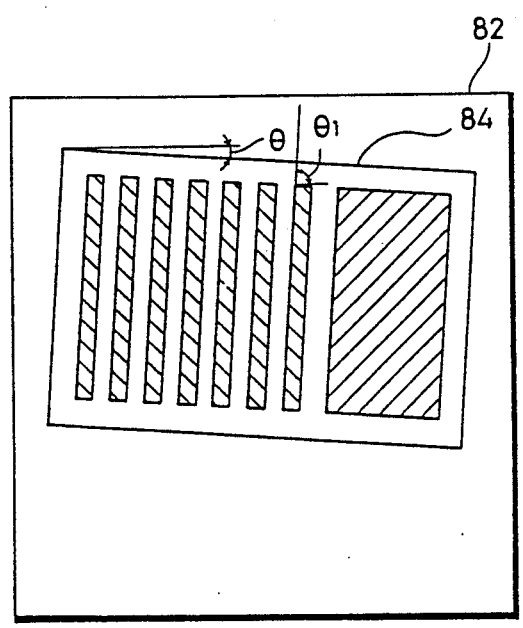

Referring to FIG. 9, for example, when an original written in vertical lines such as a text in the Japanese language is supplied to the facsimile device, or alternatively, when an original on which a text is written in lateral lines inclusive of both English and Japanese is rotated by approximately 90° and is supplied to the facsimile device, the compression efficiency of an image signal cannot be enhanced by the above-described correction alone. More specifically, the correction by employing the outputs of sensors 42a and 42c shown in FIG. 6 alone merely causes an image signal to be corrected as shown in FIG. 10.

Figure 10:
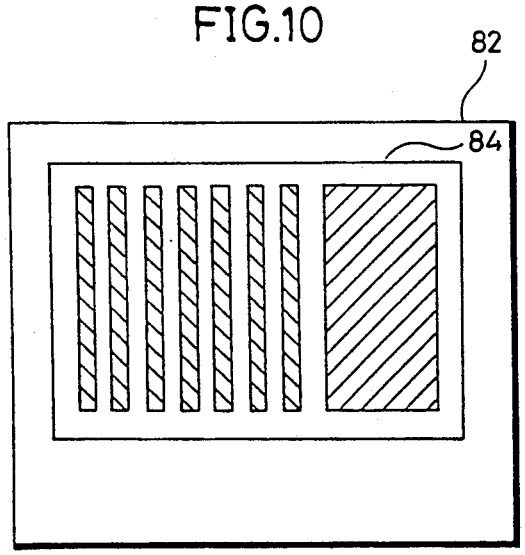

Referring to FIG. 10, in the original on which characters are arranged vertically, the foregoing correction alone does not makes the direction of text lines match the y direction of image storage area 82. Even if this image is read in the y direction and then compressed, compression efficiency is not enhanced.

Thus, a program executed in microcomputer 62 of the facsimile device in accordance with the present invention is characterized in that the direction of text lines on the original is detected before the image undergoes the transformation of the coordinate system in association with the skew angle $\theta$ of the original obtained by sensors 42a and 42c, as described above. Detection of the text line direction is carried out according to the following procedure.

First, microcomputer 62 checks an original image stored in page memory 76 and then calculates the ratio of white points to black points in each portion of the original image. It is known that there is the characteristic difference between the ratio of white points to black points in the area where only text lines are arranged (hereinafter referred to as a "text line area") and that in the area where images other than characters are formed. Therefore, examining the distribution of white and black points in original image 84 makes it possible to distinguish the text line area, in which a line image 86 including only characters is formed, over an image area 88 where the images other than characters are formed.

It is considered in general that there is no variation in compression efficiency of an image in image area 88 even if the image area is read in any directions. On the other hand, when the area where only line image 86 is formed is coded as described above, it is known that the compression efficiency of a signal is significantly enhanced when the original is read to be coded in the direction, in which line image 86 extends, as compared with the other cases. Therefore, it is considered that the compression efficiency of codes is enhanced if after the text line area is detected as in the above manner, the direction of line image 86 included in the text line area is detected, and then the image signal is coded in the detected direction.

If the text line area can be once specified, the direction of extending line image 86 as shown in FIG. 7 can easily be known. Japanese Patent Laying-Open No. 2-215269, for example, discloses a scanner apparatus characterized in that the effective width of an image in the main scanning direction is determined in accordance with the sequence of black bits in the main scanning direction and the number of black bits in the sub scanning direction. The schematic direction in which a single line image 86 of original image 84 extends can be informed by employing the technique disclosed this Laying-Open. It is assumed that the angle between this text line direction and an y axis is $\theta_1$.

Figure 11:
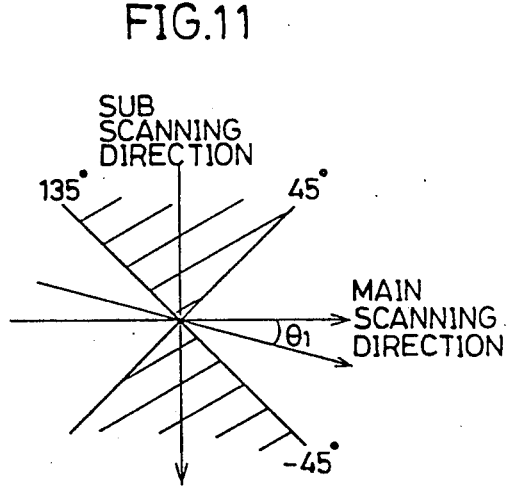
FIG. 11 is a diagram schematically showing the angle between the direction of text lines on the original and a main scanning direction.

Referring to FIG. 11, when the angle $\theta_1$ is between $-45°$ and $45°$, a determination is made that the original is supplied to the facsimile device in a state shown in FIG. 7. In this case, only a correction with respect to the angle $\theta$ detected by sensors 42a and 42c is sufficient for a correction of an image.

On the other hand, when the angle $\theta_1$ is between $45°$ and $135°$, the original is considered to be supplied to the facsimile device in the state shown in FIG. 9. In this case, original image 84 is rotated by 90° with respect to a predetermined point in image storage area 82 set as a center, before the correction of the angle $\theta$ detected by sensors 42a and 42c as mentioned above. The rotated image signal is stored in page memory 80. The original image after rotated by 90° is the same as the one shown in FIG. 7.

Microcomputer 62 subjects original image 84 transformed in such a form as shown in FIG. 7 to a processing for correcting the angle $\theta$ detected by sensors 42a and 42c. The resultant image is shown in FIG. 8. An image signal can be compressed in high efficiency by sequentially reading and coding this image.

There are provided in the foregoing description page memory 76 for initially storing the read image signal, page memory 80 for storing the image signal rotated by 90° when the angle $\theta_1$ between the text line direction and the main scanning direction is between 45° and 135°, and page memory 78 for storing the finally corrected image signal. The present invention, however, is not limited thereto, and it is thus considered that the above-described correction processing may be performed by, e.g., dividing the area of one page memory. It is also considered that one page memory may be used for different purposes FIGS. 12–19 are schematic flow charts of the program executed in microcomputer 62 of the facsimile device of the above-described embodiment. The following flow charts illustrate a program having such a structure that a processing is divided into a plurality of subroutines and is carried out by calling the subroutines from a main routine. However, the structure of the program is not limited to this, and, for example, the same effect can be achieved when all subroutines are incorporated into a main routine.

Referring to FIG. 12, the main routine of this program has the following structure. Sensor 40 (FIG. 5) detects that an original to be transmitted is set on a feeding tray, not shown, in step S001.

A required initial processing is subsequently carried out in step S002. The control proceeds to step S003.

Sensor 42 (FIG. 5), i.e., sensors 42a and 42c (FIG. 6) detects the angle $\theta$ between the leading edge of the original and the main scanning direction, i.e., the skew angle $\theta$ of the original in step S003. The control proceeds to step S004.

Image information of all originals set on the feeding tray is read and then stored in page memory 76 (FIG. 5) in step S004. The control proceeds to step S005.

A detection is made as to where a text line area exists in the original image stored in page memory 76 in step S005. The control proceeds to step S006.

A detection is made as to in which direction characters are arranged in the detected text line area, in step S006. Accordingly, the angle $\theta_1$ between the direction of text lines and the main scanning direction is evaluated. The control thereafter proceeds to step S007.

A coordinate system transformation processing for correcting the skew of an image is carried out in response to the skew angle $\theta$ of the original evaluated by sensors 42a and 42c, in step S007. When the angle $\theta_1$ is between $-45°$ and $45°$, a result of the correction is written in page memory 78. When the angle $\theta_1$ is between $45°$ and $135°$, an image signal after corrected is written in page memory 80. The control proceeds to step S008.

The following processing is carried out in step S008 in response to the angle $\theta_1$ detected in step S006. When the angle $\theta_1$ is between $-45°$ and $45°$, the corrected image signal is already stored in page memory 78. Thus, a further correction processing is not carried out. When the angle $\theta_1$ is between $45°$ and $135°$, the image is required to be further rotated by $90°$. Microcomputer 62 performs the coordinate system transformation by $90°$ for the image signal stored in page memory 80, and then writes the transformed image signal into page memory 78. Accordingly, the image signal representing the image shown in FIG. 8 is stored in page memory 78 independently of the angle $\theta_1$. The control proceeds to step S009.

In step S009, a processing is carried out in which data stored in page memory 78 is read in sequence, then coded and transmitted. When the transmission processing is terminated, this program ends.

The initial processing in step S002 includes the following processing, with reference to FIG. 13. A determination is made in step S201 as to whether or not a signal indicating that the start button is pressed is applied from panel controller 66 (FIG. 5). If a result of the determination is NO, the control returns to step S201 again, and otherwise the control proceeds to step S202.

Image memories 76-80 are enabled to be in a writable state in step S202. The control proceeds to step S203.

In step S203, a signal indicating that the transport of the original is to be started is applied to mechanics/recording control circuit 68. In response to the applied signal, feeding roller 34 and transport roller 36 start rotating. After the transport of the original to a reading position starts, the control returns to the main routine.

The processing in step S003 is carried out as follows with reference to FIG. 14. Sensors 42a and 42c (FIG. 6) detect opposite ends of the leading edge of the original supplied to the reading position and inform the program of information as to the time when the opposite ends are detected, in step S301. The control proceeds to step S302.

The time difference between the time when the original is detected by sensor 42a and the time when it is detected by sensor 42c is evaluated in step S302. The control proceeds to step S303.

In step S303, a look-up table of a skew stored in advance in a ROM (not shown) in microcomputer 62 is performed in accordance with the time difference evaluated in step S302 and information of paper size of the supplied original. If the time difference between sensors 42a and 42c detecting the original is known as described above, the skew angle $\theta$ of the original can be obtained in accordance with a certain calculation formula. In general, however, the relationship between the time difference and the skew angle $\theta$ is tabulated and stored in advance in the ROM. If the time difference and the size of the original are obtained by this tabulation, a search of the table makes it possible to look up the skew angle $\theta$ at high speed.

A skew angle $\theta$ to be evaluated is determined based on data stored in the skew table in step S304. The control proceeds to step S305.

The obtained skew angle $\theta$ is stored in a memory in microcomputer 62 in step S305. The control returns to the main routine.

The reading of image information in step S004 is carried out as follows, with reference to FIG. 15. One page of the original which is separated by rubber plate 38 and then supplied to the reading position is converted into image information by CCD 60 and then supplied to reading processing circuit 70 in step S401. The control proceeds to step S402.

An image signal corresponding to one page and input from reading processings circuit 70 is written into page memory 76 in step S402. The control proceeds to step S403.

In step S403, a determination is made as to whether or not the reading of all pages is completed. This determination is made by, e.g., original sensor 40 detecting whether or not there is a subsequent original to be read. If the answer to the determination is NO, the control returns to step S401, and otherwise the control returns to the main routine.

Figure 16:
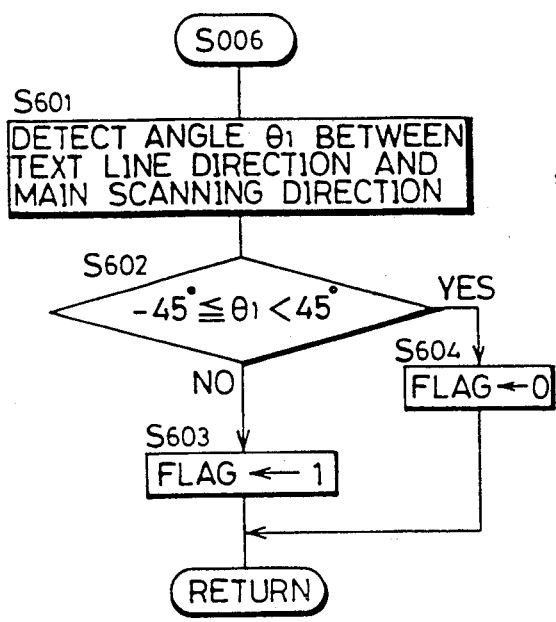
Figure 17:
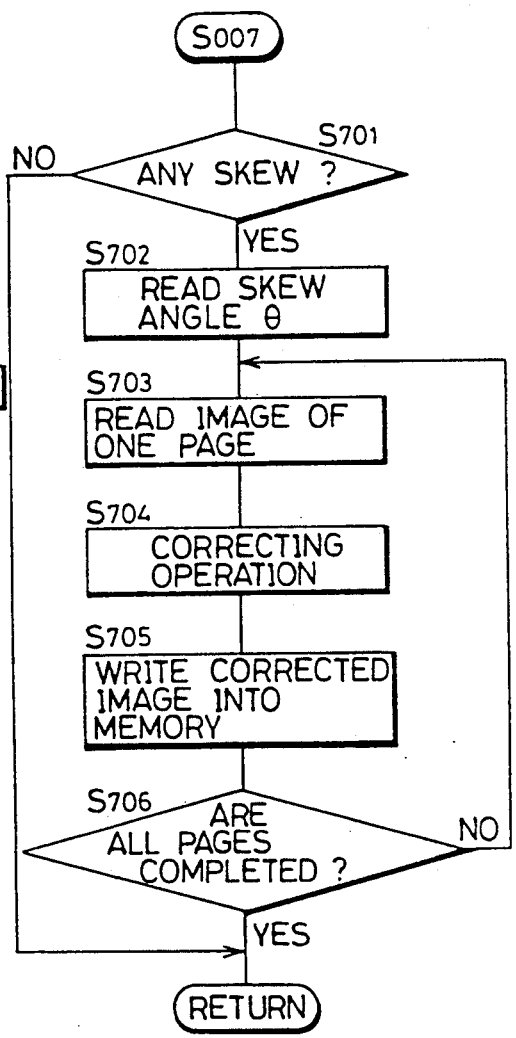

The detection of the text line direction in step S006 is carried out as follows, with reference to FIG. 16. The angle $\theta_1$ between the direction of text lines included in the original image and the main scanning direction is detected in step S601. The control proceeds to step S602.

A determination is made as to whether or not the angle $\theta_1$ is between $-45°$ and $45°$ in step S602. If the answer to the determination is NO, the control proceeds to step S603, and otherwise, the control proceeds to step S604.

In step S603, "1" is set in a flag prepared in the program for representing the text line direction of the original. The control thereafter returns to the main routine.

When the control proceeds to step S604, "0" is set in the above flag. The control then returns to the main routine.

As can be understood easily, when this flag is "0", the text line direction and the main scanning direction approximately match each other. When the flag is "1", both directions are approximately orthogonal to each other.

The skew correction processing in step S007 is performed as follows. A determination is made as to whether or not there is a skew in the drawn-in direction of the original, which is detected by sensors 42a and 42c, in step S701. If the answer to the determination is YES, the control proceeds to step S702, and otherwise the control returns to the main routine.

When the control proceeds to step S702, the skew angle θ stored in the memory in step S305 of FIG. 14 is read from the memory. The control proceeds to step S703.

An image corresponding to one page is read from page memory 76 in step S703. The control proceeds to step S704.

In step S704, a correcting operation for compensating for the skew angle θ is performed for the read image signal. This correcting operation is executed based on a well-known expression of coordinate system transformation on the basis of rotation. Alternatively, the operation is executed in accordance with the method disclosed in the above referenced U.S. Pat. No. 4,829,452. The control proceeds to step S705.

The corrected image signal is written into page memories 78 and 80 in step S705. The control proceeds to step S706.

A determination is made in step S706 as to whether or not the correcting operation is completed for the image signal of the original of all pages stored in page memory 76. If the answer to the determination is NO, the control returns to step S703, and otherwise the control returns to the main routine.

Figure 18:
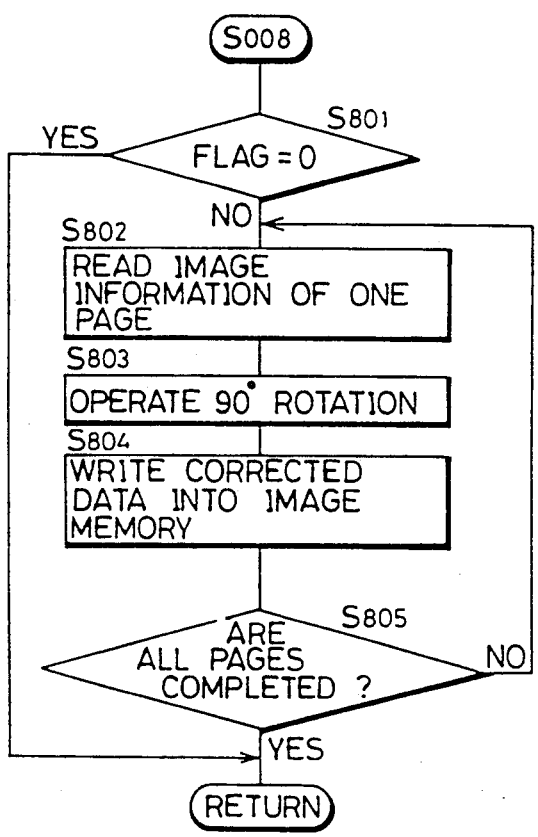

The correction of the image signal based on the text line direction in step S008 is carried out as follows, with reference to FIG. 18. In step S801, a determination is made as to whether or not the value of the flag set in steps S603, S604 of step S006 is "0". If the answer to the determination in step S801 is YES, then the text line direction of the original approximately matches the main scanning direction, as described above. Accordingly, no correction processing is carried out in this case, and the control returns to the main routine. If the answer to the determination in step S801 is NO, the control proceeds to step S802.

When the control proceeds to step S802, the text line direction on the supplied original is approximately 90° apart from the main scanning direction. An image signal corresponding to one page is read from page memory 80 in step S802. The control proceeds to step S803.

In step S803, an operation of coordinate system transformation for rotating an image through 90° is performed for the read image signal. The control proceeds to step S804.

The image signal corrected in step S803 is written into page memory 78 in step S804. The control proceeds to step S805.

A determination is made in step S805 as to whether or not the correcting operation is executed with respect to the image signal of all originals stored in page memory 80. If the answer to the determination is NO, the control returns to step S802, and otherwise the control returns to the main routine.

A description will now be made in further detail of the conversion of the image signal in steps S007 and S008. When the skew angle $\theta_1$ is between $-45°$ and $45°$, the image signal formed in page memory 76 represents the image shown in FIG. 7. In this case, the correcting operation in step S704 (FIG. 17) of step S007 causes the image signal to be converted into the one representing the original image shown in FIG. 8. In this case, no correction of the text line direction in step S008 is performed. Accordingly, an image signal indicating the original image shown in FIG. 8 is stored in page memory 78.

When the skew angle $\theta_1$ is between 45° and 135°, the original image represented by the image signal stored in page memory 76 is illustrated in FIG. 9. The correcting operation in step S704 (FIG. 17) of step S007 causes the image signal representing the original image shown in FIG. 10 to be stored in page memory 80. This image signal can not be compressed in high efficiency as it is, as described above.

In step S008, original image 84 shown in FIG. 10 is rotated by 90° to be stored in page memory 78. Accordingly, the original image stored in page memory 78 is the one shown in FIG. 8.

Figure 19:
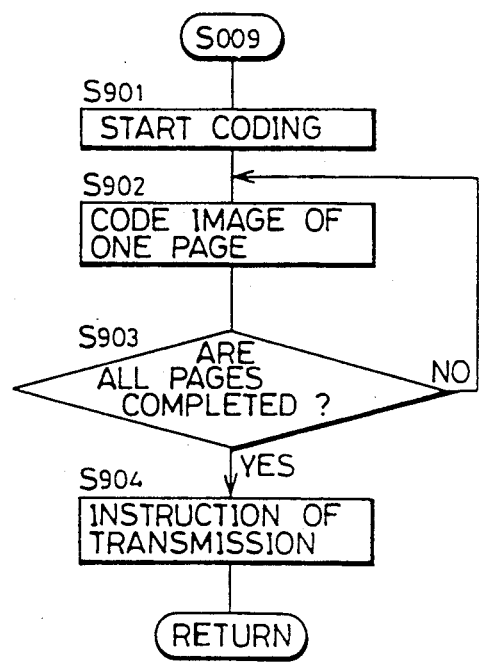

The transmission processing in step S009 is carried out as follows. With reference to FIG. 19, microcomputer 62 applies a signal indicating that coding is to be started, to page memory control circuit 74 in step S901. The control proceeds to step S902.

In step S902, page memory control circuit 74 performs reading and coding of an image signal corresponding to one page from page memory 78. The coded signal is stored in a dedicated memory for transfer, not shown. The control proceeds to step S903.

A determination is made in step S903 as to whether or not the coding processing is completed for all the pages of the original stored in page memory 78. If the answer to the determination is NO, the control returns to step S902, and otherwise the control proceeds to step S904.

When the control proceeds to step S904, microcomputer 62 applies to transmission control circuit 72 and modem 30 a signal indicating that the compressed signal stored in the dedicated transfer memory is to be transmitted onto telephone lines. Transmission control circuit 72 and modem 30 convert the compressed signal stored in the dedicated memory into an analog signal, and then transmit the analog signal onto the telephone lines via LIU 32 according to a predetermined procedure. After the processing in step S904 is terminated, the control of the program returns to the main routine.

The coding processing of the image signal in step S902 is performed with regard to the image signal representing the original image shown in FIG. 8. In this original image, the text line extending direction and the direction of reading of a signal for coding (the main scanning direction) match each other. The width of blank lines between the text lines becomes larger as compared with other cases. Therefore, the coding of the blank lines by the foregoing makeup code is carried out efficiently, and compression efficiency of the entire original becomes maximal.

As has been described above, in the facsimile device according to the embodiments of the present invention, the angle between the leading edge of the original and the main scanning direction is evaluated from the time difference between the times when the opposite ends of the leading edge of the supplied original pass respective predetermined sensors Further, the text line extending direction on the original image is detected from the original image digitized by the CCD and the reading processing circuit and stored in the page memory. The resultant image signal of the original is first subjected to the coordinate system transformation so as to correct the skew of the original to be transmitted. The coordinate system-transformed image signal is then rotated by 90°, if necessary, so that the text line extending direction on the original image representing the image signal may match the direction (the main scanning direction), in which the image signal is read from the page memory upon coding. Accordingly, when the corrected image signal is coded, the blank lines between the text lines are coded in highest efficiency, and the highest compression efficiency of the entire original image is achieved.

While the present invention has been described according to one embodiment, the invention is not limited to the foregoing embodiment. For example, the following embodiment can also be considered.

Hardware of a facsimile device for implementing a second embodiment of the present invention is identical to that shown in FIG. 5. The second embodiment is different from the first embodiment with respect to the structure of a program executed in microcomputer 62.

Figure 20:
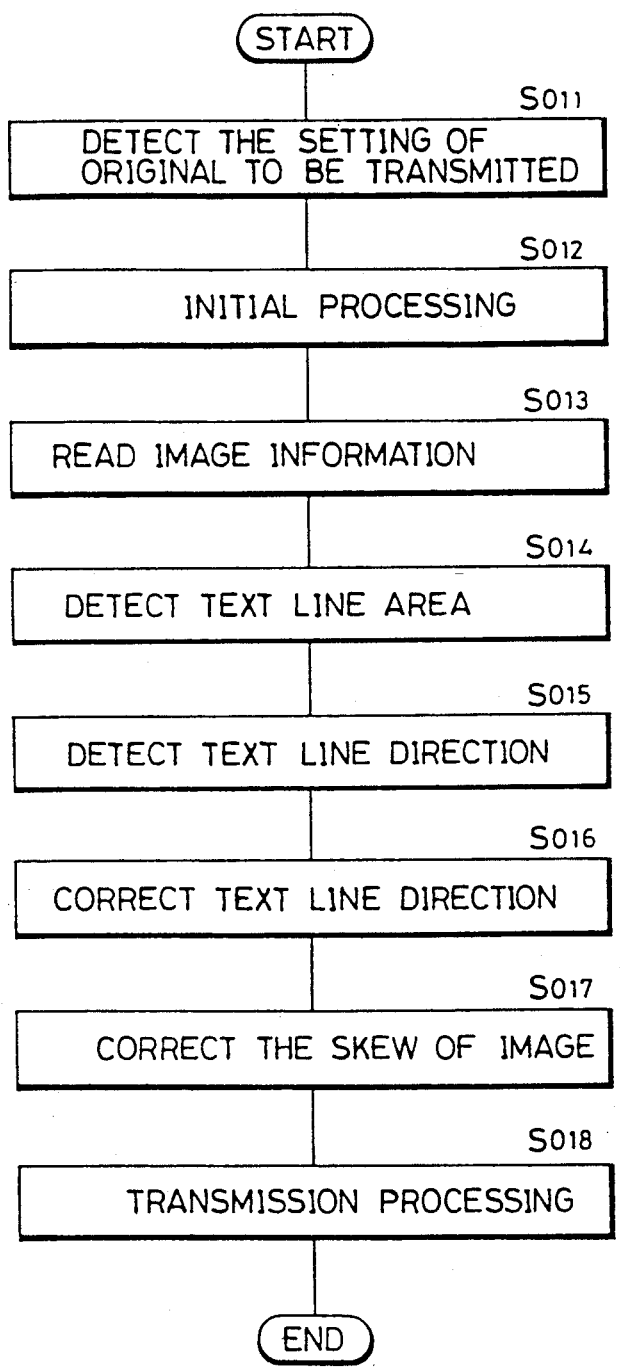
FIG. 20 is a flow chart showing a main routine of a program executed by a microcomputer in a facsimile device according to a second preferred embodiment of the present invention.

With reference to FIG. 20, the program executed in microcomputer 62 of the facsimile device of the second embodiment has the following control structure. A detection is made in step S011 as to whether or not an original to be transmitted is set on a feeding tray not shown. This processing is the same as the processing performed in step S001 of FIG. 12. The control proceeds to step S012.

A required initial processing is carried out in step S012. This processing is the same as the processing in step S002 of FIG. 12. The control proceeds to step S013.

Image information is read with respect to all the originals set on the feeding tray in step S013. This processing is the same as that in step S004 of FIG. 12. The control proceeds to step S014.

A detection is made in step S014 as to which portion a text line area corresponds to on the read original image. This processing is the same as that in step S005 of FIG. 12. The control proceeds to step S015.

A direction in which text lines extend in the detected text line area is detected in step S015. This processing is approximately the same as that in step S006 of FIG. 12. In this step S015, however, the text line extending direction is detected more accurately than the detection carried out in the first embodiment. The control proceeds to step S016.

In step S016, a processing for rotating the original image by 90° is performed, if necessary, so that the text lines may be arranged in a direction approximately matching the main scanning direction based on the detected text line direction. This processing is the same as that in step S008 of the first embodiment. The control proceeds to step S017.

In step S017, the image signal, which is corrected so as to make the text line extending direction approximately match the main scanning direction after correction, is further corrected to make the text line extending direction and the main scanning direction more accurately match each other. This processing is approximately the same as that in step S007 of the first embodiment. In this case, however, as different from the first embodiment, it should be noted that an angle for correction is derived from the text line direction obtained in step S015. After the processing in step S017 is performed for the image signal of all pages, this program is terminated.

The same effect as that of the first embodiment can be achieved even by the program having the above-described structure. More specifically, this embodiment also makes it possible to compress the image signal in high efficiency independently of the direction of the original supplied to the facsimile device.

In the second embodiment, the processing in step S016 and that in step S017 have been described separately. This invention is, however, not limited to this. For example, it is also possible to make a program in which the angle between the text line direction obtained in step S015 and the main scanning direction may be corrected by a single operation processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device comprising:
   pixel signal generating means for reading an image on an original by partitioning said image into a plurality of pixels arranged two-dimensionally, to generate a pixel signal indicating luminance of each of said pixels for each of said pixels;
   pixel signal storing means including a plurality of memory cells each for storing said pixel signals logically associated with one of said pixels,
   said plurality of memory cells being arranged corresponding to an arrangement of said plurality of pixels and logically two-dimensionally in a predetermined first direction and a second direction crossing said first direction;
   text line direction detecting means responsive to said pixel signals stored in said pixel signals stored in said pixel signal storing means for detecting a text line direction indicating an extending direction of text lines included in said image on said original represented by said stored pixel signals in the arrangement of said plurality of memory cells;
   text line direction determining means for determining whether said detected text line direction is closer to said first direction or said second direction;
   image rotating means responsive to an output of said text line direction determining means for rotating said image on said original represented by said stored pixel signals by a predetermined angle so as to make said text line direction closer to said first direction than to said second direction when said text line direction is closer to said second direction than said first direction;
   signals compressing means for reading said stored pixel signals rotated by said image rotating means from said pixel signal storing means which stores the pixel signals rotated in said first direction, to compress the read pixel signal by a compression code; and
   transmission means for transmitting said pixel signals compressed by said signal compressing means to another station via a communication line.

2. The facsimile device according to claim 1, further comprising
   angle difference detecting means for detecting a difference in angle between said detected text line direction and said first direction; wherein
   said predetermined angle is selected to compensate for said detected angle difference.

3. The facsimile device according to claim 2, wherein said original comprises an edge of a straight line; and
   said facsimile device further comprises means for detecting an angle between said edge represented by said stored pixel signals and said first direction, and means for detecting an angle between said text line direction and said edge.

4. The facsimile device according to claim 3, wherein said pixel signal generating means includes means for scanning said original on said straight line in a predetermined main scanning direction along a predetermined straight line, to convert the scanned original into said pixel signals, said pixel signals generated by a single scanning in said main scanning direction being stored in said pixel signal storing means in said first direction; and said pixel signal generating means further includes means for supplying said original toward said predetermined straight line at predetermined supply speed in a predetermined direction.

5. The facsimile device according to claim 4, wherein said edge includes two opposite ends; and said facsimile device further includes means for detecting a time difference between respective times when said two opposite ends cross over said predetermined straight line, and means for detecting an angle between said edge and said main scanning direction in response to said detected time difference and said supply speed.

6. The facsimile device according to claim 1, wherein said predetermined angle is a right angle.

7. The facsimile device according to claim 1, wherein said text line direction detecting means includes means for detecting a text line area where only text lines are formed on said original, means for distinguishing between said text lines and blank lines between said text lines in said detected text line area, and means for detecting the direction of said text lines from the arrangement of said text lines and said blank lines.

8. The facsimile device according to claim 1, wherein said text line direction determining means includes angle range detecting means for detecting that the angle between said text line direction and said first direction is within a predetermined range, and means responsive to an output of said angle range detecting means for determining that said text line direction is closer to said first direction than to said second direction.

* * * * *